United States Patent Office.

WILLIAM H. TATE, OF ORLEANS, INDIANA.

Letters Patent No. 68,582, dated September 3, 1867.

IMPROVED MEDICAL COMPOUND.

*The Schedule referred to in these Letters Patent and making part of the same.*

TO WHOM IT MAY CONCERN:

Be it known that I, WILLIAM H. TATE, of Orleans, in the county of Orange, in the State of Indiana, have invented a new and valuable Medicine for the cure of fever and ague and other bilious diseases; and I do hereby declare that the following is a full, clear, and exact description of the said medicine, and the method of preparing the same.

The nature of my invention and discovery consists in extracting the essential properties of the burs of the herb called *Arctium*, or burdock, and combining them with spirits of lavender and alcohol.

I make my said medicine as follows, namely: I first fill a kettle with the burs of the *Arctium*, and water for boiling the same, and subject them to proper heat for evaporation, being careful always that the water shall not all be evaporated, and thereby scorch or burn the contents of the kettle. I continue to pour in water from time to time, and evaporate the same until the essential properties of the *Arctium* burs are extracted into a lye or sirup. I then carefully strain the sirup so obtained into a suitable vessel, and allow it to cool. After cooling I add one ounce of the spirits of lavender to every six quarts of the sirup, and to the same quantity add one quart of alcohol. The amount of alcohol used is varied to suit the climate in which the medicine is to be used, the alcohol being the means by which the medicine is preserved from fermentation and mould.

What I claim as my invention, and desire to secure by Letters Patent, is—

A medicine composed of the extract of *Arctium* burs, combined with spirits of lavender and alcohol, substantially as herein specified.

WM. H. TATE.

Witnesses:
    F. A. TATE,
    JACK J. TATE.